(12) United States Patent
Walker et al.

(10) Patent No.: US 7,645,470 B2
(45) Date of Patent: Jan. 12, 2010

(54) IRON-FORTIFIED, MILK-BASED, FLAVORED BEVERAGES WITH IMPROVED COLOR

(75) Inventors: Sherri A. Walker, Sunbury, OH (US); Stephanie L. Rodgers, Galena, OH (US); Stefanie F. Kaufman, Reynoldsburg, OH (US); Amy L. Marchio, Centerburg, OH (US); Emily G. Adams, Pataskala, OH (US); Gaurav C. Patel, Gahanna, OH (US); Thakorbhai P. Patel, Gahanna, OH (US)

(73) Assignee: Abbott Laboratories, Abbott Park, IL (US)

( * ) Notice: Subject to any disclaimer, the term of this patent is extended or adjusted under 35 U.S.C. 154(b) by 570 days.

(21) Appl. No.: 11/406,673

(22) Filed: Apr. 19, 2006

(65) Prior Publication Data

US 2006/0240151 A1 Oct. 26, 2006

Related U.S. Application Data

(60) Provisional application No. 60/673,152, filed on Apr. 20, 2005.

(51) Int. Cl.
*A23L 1/304* (2006.01)
(52) U.S. Cl. .................... 426/74; 426/580; 426/584; 426/650; 426/654
(58) Field of Classification Search .............. 426/74, 426/580, 584, 650, 654, 620, 615, 640, 639, 426/658, 583, 599
See application file for complete search history.

(56) References Cited

U.S. PATENT DOCUMENTS

| 5,002,779 | A | * | 3/1991 | Mehansho et al. ............ 426/72 |
| 5,888,563 | A | | 3/1999 | Mehansho et al. |
| 6,106,874 | A | | 8/2000 | Liebrecht et al. |
| 6,455,082 | B1 | | 9/2002 | Sher et al. |
| 6,461,652 | B1 | | 10/2002 | Henry et al. |
| 6,475,539 | B1 | * | 11/2002 | DeWille et al. ............... 426/72 |
| 6,607,761 | B2 | | 8/2003 | Henry et al. |
| 6,720,020 | B2 | | 4/2004 | Karleskind et al. |
| 6,774,111 | B1 | | 8/2004 | Wolf et al. |
| 6,811,801 | B2 | * | 11/2004 | Nguyen et al. ............... 426/250 |
| 6,994,876 | B1 | | 2/2006 | Sher et al. |

FOREIGN PATENT DOCUMENTS

| WO | WO 00/28838 | 5/2000 |
| WO | WO 00/51446 | 9/2000 |
| WO | WO 01/55098 | 8/2001 |
| WO | WO2005/023018 A1 | 3/2005 |

OTHER PUBLICATIONS

Wolf, et al., "Supplemental Fructose Attenuates Postprandial Glycemia in Zucker Fatty fa/fa Rats," 2002, J. Nutr., vol. 132, p. 1219-1223.

* cited by examiner

*Primary Examiner*—Helen F Pratt
(74) *Attorney, Agent, or Firm*—William J. Winter; Sandra E. Weida; Mimi C. Goller

(57) ABSTRACT

Disclosed are flavored nutritional beverages comprising (A) fat; (B) milk protein representing from about 10% to 100% by weight of total protein; (C) carbohydrate comprising from about 75% to 100% by weight of at least one of (i) from about 0.1% to about 10% sucrose, trehalose, or combination thereof, by weight of the beverage, and (iii) from about 0.1% to about 20% maltodextrin by weight of the nutritional liquid, the maltodextrin having a DE value of from about 1 to about 10, and (iii) combinations of (i) and (ii); (D) an iron-containing material, and (E) a flavorant. The flavored nutritional beverages, unlike many iron-fortified milk-based beverages available today, do not readily develop beige or gray hues during formulation, processing and storage, and are thus more easily formulated with little or no color distortion and with improved or more accurately matched flavor-color combinations.

19 Claims, No Drawings

IRON-FORTIFIED, MILK-BASED, FLAVORED BEVERAGES WITH IMPROVED COLOR

This application is related to Provisional Application No. 60/673,152 filed Apr. 20, 2005

TECHNICAL FIELD

The present invention relates to iron-fortified, milk-based, flavored beverages having improved color.

BACKGROUND OF THE INVENTION

Many different nutritionals liquids or beverages are commercially available or otherwise known in the nutrition and formulation arts. These beverages or liquids most typically contain a balance or selected concentration of protein, carbohydrate, fat, vitamins, and minerals, some commercial examples of which include Boost Plus®, available from Novartis, Ensure® and Glucema® Shakes available from Ross Products Division, Abbott Laboratories, Columbus, Ohio, USA.

Among the myriad of such balanced nutritional beverages available to consumers, many are formulated as ready-to-feed liquids in aseptically processed or retort packaged single use cans, bottles, or other containers. These packaged beverages are formulated with an emphasis on delivering stable, balanced nutritionals that taste good and appeal to a broad range of consumer tastes. To appeal to a variety of consumer tastes, these beverages are often flavored with one or more common flavors such as vanilla flavor, chocolate, caramel flavor, fruit flavor, berry flavor, butter pecan flavor, coffee flavor, cinnamon or spice, and so forth.

These flavored beverages are also formulated so that the selected flavor matches that of the chosen color. For example, banana flavored beverages should be yellow, vanilla flavored beverages should be white, chocolate flavored beverages should be beige, and so forth. Matching flavors and colors, however, can be a challenge for many milk-based beverages. These beverages contain a variety of nutrients that potentially interact during formulation, processing and storage. These interactions can distort the color of beverage with gray, beige, or similar other discolorations, thus affecting the desired match between product flavor and color. This flavor-color matching is especially difficult in milk-based beverages in which the desired color is more readily distorted by beige or gray hues, e.g., vanilla flavored beverages, banana flavored beverages.

It has been found that iron-fortified milk-based beverages are particularly difficult to formulate with matched flavor-color combinations, especially for colors as noted above that are more readily distorted by beige and/or gray hues.

It would therefore be desirable to formulate a flavored beverage comprising fat, protein, carbohydrates, and minerals, wherein the beverage develops little or no beige and/or gray hues during formulation, processing, and storage. It would also be desirable to prepare such a beverage, especially an iron-fortified beverage, wherein the flavor and color of the beverage are accurately matched or otherwise minimally affected by the undesirable development of beige and or gray hues.

SUMMARY OF THE INVENTION

The present invention is directed to flavored nutritional beverages comprising (A) fat; (B) milk protein representing from about 10% to 100% by weight of total protein; (C) carbohydrate comprising from about 75% to 100% by weight of at least one of (i) from about 0.1% to about 10% sucrose, trehalose, or combination thereof, by weight of the beverage, and (ii) from about 0.1% to about 20% maltodextrin by weight of the beverage, the maltodextrin having a DE value of from about 1 to about 10, and (iii) combinations of (i) and (ii); (D) an iron-containing material, and (E) a flavorant.

It has been found that the flavored nutritional beverages of the present invention, unlike many iron-fortified milk-based beverages available today, do not readily develop beige or gray hues during formulation, processing and storage. These new beverages are therefore more easily formulated with little or no color distortion and with improved or accurately matched flavor-color combinations.

DETAILED DESCRIPTION OF THE INVENTION

The nutritional beverages of the present comprise as essential ingredients milk protein, fat, a defined carbohydrate system, iron, and a flavorant. These and other essential or optional elements or features of the beverages of the present invention are described in detail hereinafter.

The term "nutritional beverage" and "flavored nutritional beverage" are used interchangeably herein and mean oral drinks in the form of aqueous emulsions comprising fat, protein, carbohydrate, iron, and flavorants, preferably to the exclusion of enteral tube feedings where product color is not so much a consumer noticeable issue.

The nutritional beverages of the present invention may comprise, consist of, or consist essentially of the essential elements and limitations of the invention described herein, as well as any additional or optional ingredients, components, or limitations described herein or otherwise useful in a nutritional or pharmaceutical application.

All percentages, parts and ratios as used herein are by weight of the total composition, unless otherwise specified. All such weights as they pertain to listed ingredients are based on the active level and, therefore, do not include solvents or by-products that may be included in commercially available materials, unless otherwise specified.

All numerical ranges as used herein, whether or not expressly preceded by the term "about", are intended and understood to be preceded by that term, unless otherwise specified.

All references to singular characteristics or limitations of the present invention shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The nutritional beverages of the present invention may also be substantially free of any optional ingredients described herein. In this context, the term "substantially free" means that the selected composition contains less than a functional amount of the optional ingredient, including zero percent by weight of such optional ingredient.

Product Form

The nutritional beverages of the present invention are iron-fortified, milk-based, aqueous emulsions comprising a balance of fat, protein, carbohydrate, iron and flavorants, all as described hereinafter. These beverages are intended for oral consumption and may be formulated as meal replacement products or to provide supplemental or primary source nutrition.

The nutritional beverages of the present invention include brighter colored beverages defined by an Agtron Score of at least about 20, including from about 25 to about 70, and also including from about 28 to about 40, and also including from about 29 to about 36, non limiting examples of which include vanilla flavored beverages, strawberry flavored beverages, butter pecan flavored beverages, banana flavored beverages, berry flavored beverages, fruit flavored beverages, and combinations thereof.

The nutritional beverages of the present invention also include darker-colored beverages defined by Agtron Scores of less than about 15, including from about 7 to about 13, and also including from about 9 to about 12, non limiting examples of which include chocolate flavored beverages, caramel flavored beverages, coffee flavored beverages, and combinations thereof.

Other non limiting examples of other suitably flavored or colored beverages include those formulations actively colored with dyes or other similar colorants to form a beverage having a distinctive color such as blue, orange, red, green, violet, yellow, or combinations thereof. These actively colored beverages are especially popular among children and can fall within the darker-colored or brighter-colored beverages, depending upon the intensity of the selected color and the other ingredients in the beverage. The color technology described here can help make these actively colored beverages have a lighter or brighter colored appearance as well.

Agtron Scores as used herein are measured by conventional techniques using an Agtron 45 Spectrophotometer (available from Agtron Inc., Reno, Nev., USA). The Agtron Scores are a measure of reflected energy (light) from the surface of each nutritional beverage. The more reflective or brighter in color the product surface, the higher the Agtron score. These scores range from zero (black) to 100 (white).

The nutritional beverages of the present invention may also be formulated with any caloric density suitable for oral consumption. The beverages most typically comprise, on a ready-to-feed or as fed basis, up to about 3 kcal/ml, including from about 0.5 kcal/ml to about 2.0 kcal/ml, and also including from about 0.9 kcal/ml to about 1.5 kcal/ml, and also including from about 1 kcal/ml to about 1.2 kcal/ml The nutritional beverages are all in liquid form, either as ready-to-feed liquids or as dilutable liquid concentrates, including aseptically packaged or retort processed single or multi dose cans, bottles or other containers. Single use bottles or cans are especially useful in this respect.

Macronutrients

The nutritional beverages of the present invention include fat, protein, and carbohydrate, each of which is described hereinafter. Although concentrations or amounts of each macronutrient in the nutritional beverage of the present invention can vary dramatically depending upon the nutritional needs of the intended user, such concentrations or amounts most typically (but not always) fall within one of the following embodied ranges.

| Macronutrient | Embodiments[1] | | |
|---|---|---|---|
| | A | B | C |
| Carbohydrate[2]—% total calories | 10-85 | 20-60 | 40-60 |
| Fat—% total calories | 10-85 | 10-50 | 15-35 |
| Protein[3]—% total calories | 5-80 | 10-30 | 15-25 |

-continued

| Macronutrient | Embodiments[1] | | |
|---|---|---|---|
| | A | B | C |
| Carbohydrate[2] g/100 ml | 1-40 | 4-30 | 10-20 |
| Fat g/100 ml | 0.1-30 | 0.5-15 | 1-5 |
| Protein[3] g/100 ml | 0.5-30 | 1-15 | 2-10 |

[1]Each numerical value in a range is preceded by the term "about"
[2]Includes at least one of sucrose, trehalose or maltodextrin DE 1-10, representing 75-100 wt % of total carbohydrates
[3]Includes milk protein which represents 10-100 wt % of total protein 1. Fat The nutritional beverages of the present invention comprise fat, most typically as emulsified droplets within the finished beverage product. Suitable fats or sources thereof include any that are known for or otherwise safe for use in an oral nutritional products, non limiting examples of which include coconut oil, fractionated coconut oil, soy oil, corn oil, olive oil, safflower oil, high oleic safflower oil, MCT oil (medium chain triglycerides), sunflower oil, high oleic sunflower oil, palm and palm kernel oils, palm olein, canola oil, marine oils, cottonseed oils, and combinations thereof.

The nutritional beverages may comprise, as part of the fat component, polyunsaturated fatty acids, including polyunsaturated fatty acid esters or other natural or synthetic source, including short chain (less than about 6 carbon atoms per chain), medium chain (from about 6 to 18 carbon atoms per chain) and long chain (having at least about 20 carbon atoms per chain) fatty acids having two or more carbon:carbon double bonds, including n-3 (omega-3) and n-6 (omega-6) polyunsaturated fatty acids.

Non limiting examples of polyunsaturated fatty acids suitable for use herein include alpha-linolenic acid (ALA, C18:3n-3), stearidonic acid (C18:4n-3), eicosapentaenoic acid (EPA, C20:5n-3), docosapentaenoic acid (C22:5n-3), docosahexaenoic acid (DHA, C22:6n-3), linoleic acid (C18:2n-6), gamma-linolenic acid (GLA, C18:3n-6), eicosadienoic acid (C20:2n-6), arachidonic acid (ARA, C20:4n-6), di-homo-gamma-linolenic acid (DGLA, C20:3n-6), and combinations thereof.

2. Protein

The nutritional beverages of the present invention comprise milk protein as one of or the only protein within the beverage, wherein the milk protein represents from about 10% to 100%, including from about 50% to 95%, and also including from 80% to 90%, by weight of the total protein in the beverage.

Milk proteins for use in the nutritional beverages of the present invention are most typically derived from cows milk. Non limiting examples of available milk protein sources include milk protein isolates, casein protein isolates, milk protein concentrate, whole cows milk, partially or completely defatted milk, and so forth. The milk protein preferably comprises milk protein isolate, milk protein concentrate, or both, and is most preferably 100% milk protein isolate.

Proteins suitable for use in the liquid nutritional products, which must inherently include or be combinable with the requisite milk protein component, include hydrolyzed, partially hydrolyzed or non-hydrolyzed proteins or protein sources, and can be derived from any known or otherwise suitable source such as cows milk (e.g., casein, whey), animal (e.g., meat, fish), cereal (e.g., rice, corn), vegetable (e.g., soy), or combinations thereof.

The proteins for optional use in combination with the milk protein component may also include free amino acids known for use in nutritional products, non-limiting examples of which include alanine, arginine, asparagine, carnitine, aspartic acid, cystine, glutamic acid, glutamine, glycine, histidine, isoleucine, leucine, lysine, methionine, phenylalanine, proline, serine, taurine, threonine, tryptophan, taurine, tyrosine, valine, and combinations thereof. These amino acids are most typically used in their L-forms, although the corresponding D-isomers may also be used when nutritionally equivalent. Racemic or isomeric mixtures may also be used.

3. Carbohydrate

The nutritional beverages of the present invention comprise a carbohydrate component, which includes one or more selected carbohydrates from the group of sucrose, trehalose, and certain defined maltodextrins, wherein the selected carbohydrates represent from about 75% to 100%, including from about 90% to 100%, and also including from about 98% to 100%, and also including 100%, by weight of the total carbohydrate in the beverage.

In the nutritional beverages of the present invention, the total concentration of the selected carbohydrate ranges from about 0.1% to about 20%, including from about 1% to about 10%, and also including from about 3% to about 8%, by weight of the beverage.

The defined maltodextrins for use in the carbohydrate component are those having a DE (Dextrose Equivalent) value of from about 1 to about 10, including from about 2 to about 7, and also including from about 3 to about 6. Non limiting examples of suitable maltodextrins include Maltrin® M040 (DE range 4-7), Maltrin® M050 (DE range 4-7), Maltrin® 070 (DE range 6-9), Maltrin® M440 (DE range 4-7), all available from Grain Processing Corporation, Muscatine, Iowa, USA.

Although other carbohydrates can be formulated into the nutritional beverages of the present invention, it is preferred that the beverages are free of such other carbohydrates. In the event that other carbohydrates are added to the nutritional beverage, such other carbohydrates must not exceed 25%, preferably less than 10%, more preferably less than 2%, most preferably zero percent, by weight of the total carbohydrates in the beverage. The nutritional beverages, therefore, include those embodiments comprising zero percent of such higher DE maltodextrins.

Such other carbohydrates suitable for use in the nutritional beverages of the present invention include carbohydrates that are simple, complex, or variations or combinations thereof. Non-limiting examples of such other carbohydrates include hydrolyzed or modified starch or cornstarch, maltodextrins having a DE of from 11-20, glucose polymers, corn syrup, corn syrup solids, rice-derived carbohydrate, glucose, fructose, lactose, high fructose corn syrup, indigestible oligosaccharides (e.g., fructooligosaccharides), honey, sugar alcohols (e.g., maltitol, erythritol, sorbitol), and combinations thereof.

Non limiting examples of such other carbohydrates also include dietary fiber, non-limiting examples of which include gum arabic, sodium carboxymethyl cellulose, guar gum, citrus pectin, low and high methoxy pectin, oat and barley glucans, carrageenan, psyllium, oat hull fiber, pea hull fiber, soy hull fiber, soy cotyledon fiber, sugar beet fiber, cellulose, corn bran, and combinations thereof.

Iron

The nutritional beverages of the present invention comprise an iron-containing material. Iron-containing materials for use in the beverages include any iron-containing material known or otherwise safe and effective for oral administration.

The term "iron fortified" as used herein means that the composition comprises an iron-containing material as defined herein.

The concentration of iron (from the iron-containing material) most typically ranges up to about 20 mg/100 ml, including from about 0.01 mg to about 5 mg/100 ml, and also including from about 0.5 mg/100 ml to about 4 mg/100 ml. In this context, iron concentrations are calculated and recited on an elemental iron basis.

Non limiting examples of iron-containing materials for use in the beverages of the present invention includes one or more of ferrous fumarate, ferrous succinate, ferric saccharate, ferric glycerophosphate, ferrous citrate, ferrous tartrate, ferric pyrophosphate, and ferric orthophosphate, preferably one or more of ferrous fumarate, ferrous succinate, iron sulfate (including ferrous and ferric sulfate), ferric saccharate, iron phosphate (including ferric glycerophosphate), ferrous citrate, ferrous tartrate, and combinations thereof.

Other suitable iron-containing materials include iron-bound nutrients such as iron bound proteins, amino acids, or carbohydrates, many examples of which are known in the various nutrition related arts, e.g., ferrous glycinate.

It has been found that the color technology is especially useful when used in beverages comprising water soluble iron-containing materials, or iron-containing materials that are otherwise soluble in the nutritional beverage. In this context, the nutritional beverages of the present invention include those embodiments in which from about 50% to 100%, including from about 75% to 100%, including 100%, by weight of the iron-containing material is water soluble or otherwise soluble in the beverage matrix. In this respect, water solubility is defined in accordance with the standards for water-soluble materials listed in the Merck Index, $12^{th}$ edition. Most notable among such soluble iron-containing materials are iron sulfates.

Flavorant

The nutritional beverages of the present invention comprise a flavor, concentrations of which may vary substantially depending upon the selected flavor and other ingredients, as well as the desired flavor profile or intensity desired. Any flavor that is known or otherwise suitable for use in nutritionals or other oral products may be used in the nutritional beverages herein, provided that such flavorant is also compatible with the other selected ingredients.

Such flavors may be natural or synthetic and can be provided by a single or multiple flavored materials. Flavors for use in the nutritional beverages are most typically a combination of many ingredients to provided the desired flavor association.

Non-limiting examples of suitable flavorants include enzyme-modified flavors (e.g., dairy flavors), fermentation flavors (e.g., dairy flavors), reaction flavors (e.g., chocolate, caramel), natural extracts (e.g., vanilla, coffee, chocolate), and combinations thereof. Preferred for use herein include chocolate flavor, vanilla flavor, and combinations thereof.

Non-limiting examples of other specific flavors suitable for use herein include butter pecan flavor, orange, lemon, lime, apricot, grapefruit, yuzu, sudachi, apple, grape, strawberry, pineapple, banana peach, melon, apricot, ume, cherry, raspberry, blueberry, butter, vanilla, tea, coffee, cocoa or chocolate, mint, peppermint, spearmint, Japanese mint, asafetida, ajowan, anise, angelica, fennel, allspice, cinnamon, camomile, mustard, cardamon, caraway, cumin, clove, pepper, coriander, sassafras, savory, *Zanthoxyli Fructus*, perilla, juniper berry, ginger, star anise, horseradish, thyme, tarragon, dill, capsicum, nutmeg, basil, marjoram, rosemary, bayleaf, wasabi, beef, pork, chicken, fish, crustacean, dried and smoked fish, seaweed, wine, whisky, brandy, rum, gin, liqueur, floral flavors, onion, garlic, cabbage, carrot, celery, mushroom, tomato, and combinations thereof.

Flavor concentrations in the nutritional beverages most typically range up to about 10%, by weight of the beverage, including from about 0.01% to about 7%, and also including from about 1% to about 6%, and also including from about 1.5% to about 5%, by weight of the beverage.

Sodium Hexametaphosphate

The nutritional beverages of the present invention may further comprise sodium hexametaphosphate, concentrations of which range from about 0.02% to about 5%, including from about 0.05% to about 2%, and also including from about 0.07% to about 1.0%, and also including from about 0.08% to about 0.15%, by weight of the beverage.

It has been found that the addition of sodium hexametaphosphate further increases the light colored appearance—increases Agtron Scores—of the final beverage product. It was found that sodium hexametaphosphate, unlike several other phosphates tested (sodium acid pyrophosphate, trisodium phosphate, tetrasodium pyrophosphate, and trisodium polyphosphate), improved or increased Agtron Scores of the beverages. In this respect, it is not completely understood exactly why sodium hexametaphosphate was the only phosphate to acceptably enhance color performance of the nutritional beverages.

Sodium hexametaphosphate is especially effective when used to increase Agtron Scores for beverages containing tricalcium phosphate (as a calcium source).

Optional Ingredients

The nutritional beverages of the present invention may further comprise other optional components that may modify the physical, chemical, aesthetic or processing characteristics of the products or serve as pharmaceutical or additional nutritional components when used in the targeted population. Many such optional ingredients that are known or otherwise suitable for use in other nutritional products may also be used in the beverages herein, provided that such optional ingredients are safe and effective for oral administration and are compatible with the essential and other ingredients in the selected product form.

Non-limiting examples of other optional ingredients include preservatives, emulsifying agents, buffers, antioxidants, pharmaceutical actives, sweeteners including artificial sweeteners (e.g., saccharine, aspartame, acesulfame K, sucralose) colorants, additional flavors, thickening agents and stabilizers, and so forth.

The nutritional beverages of the present invention may further comprise vitamins or related nutrients, non-limiting examples of which include vitamin A, vitamin D, vitamin E, vitamin K, thiamine, riboflavin, pyridoxine, vitamin $B_{12}$, carotenoids (e.g., beta-carotene, zeaxanthin, lutein, lycopene), niacin, folic acid, pantothenic acid, biotin, choline, inositol, salts and derivatives thereof, and combinations thereof.

The nutritional beverages may further comprise minerals, non-limiting examples of which include phosphorus, magnesium, zinc, manganese, sodium, potassium, molybdenum, chromium, chloride, and combinations thereof.

The nutritional beverages may further comprise a calcium-containing material, examples of which include any calcium source that is known for or otherwise safe and effective for use in an oral beverage, including calcium chloride, calcium citrate, calcium malate, calcium carbonate, tricalcium phosphate, and so forth. Optional calcium concentrations typically range up to about 300 mg/100 ml, including from about 20 mg/100 ml to about 200 mg/100 ml, and also including from about 50 mg/100 ml to about 110 mg/100 ml. In this context, calcium concentrations are calculated and referenced in terms of elemental calcium. Calcium carbonate and tricalcium phosphate are particularly useful in the nutritional beverages described herein.

Manufacture

The nutritional beverages of the present invention may be prepared by any known or otherwise effective manufacturing technique for preparing a liquid nutritional formulation. Many such techniques are known in the nutrition and formulation arts and can easily be applied by one of ordinary skill in the art to the nutritional beverages described herein.

The nutritional beverages, for example, may be prepared by first forming an oil and fiber (if any) blend containing all formulation oils, any emulsifier, any fiber and fat-soluble vitamins. Additional slurries (typically a carbohydrate and up to about two protein slurries) are prepared separately by mixing the carbohydrate and minerals together and mixing the protein in water. The slurries are then mixed together with the oil blend. The resulting mixture is homogenized, heat processed, standardized with any water-soluble vitamins, flavored and the liquid terminally sterilized or aseptically filled.

EXAMPLES

The following examples illustrate specific embodiments of the nutritional beverages of the present invention, including a suitable technique to prepare the beverages. The examples are given solely for the purpose of illustration and are not to be construed as limitations of the present invention, as many variations thereof are possible without departing from the spirit and scope of the invention.

The ingredients for each exemplified beverage are described in the following tables. Each exemplified formula has a pH of from 4 to 7.

Example 1

Flavored Nutritional Beverage

| Ingredient | Gm/kg | Ingredient | gm/kg |
|---|---|---|---|
| Water | QS 100 | Sodium citrate | 1.68 |
| Sucrose | 92.3 | Magnesium chloride | 1.12 |
| Maltodextrin DE 4-7[1] | 68.9 | Sodium chloride | 0.72 |
| Milk protein isolate[2] | 36.9 | Choline chloride | 0.48 |
| Soy oil | 13.31 | Viscarin SA 359[4] | 0.45 |
| Corn oil | 5.32 | Ascorbic acid | 0.38 |
| Canola oil | 4.11 | UTM/TM Premix | 0.36 |
| Soy protein isolate[3] | 4.0 | 45% KOH solution | 0.31 |
| Potassium citrate | 2.7 | WSV Premix | 0.07 |
| Tricalcium phosphate micron. | 1.3 | Vitamin DEK Premix | 0.065 |
| Magnesium phosphate dibasic | 1.85 | Vitamin A palmitate | 0.0082 |

-continued

| Ingredient | Gm/kg | Ingredient | gm/kg |
|---|---|---|---|
| Soy lecithin | 1.45 | Potassium iodide | 0.00018 |
| | | Flavor[5] | 4.1 |

[1]Maltrin ® M040, Grain Processing Corp., Muscatine, Iowa, USA
[2]Alapro ® 4900, New Zealand Milk Products Inc., New Zealand
[3]Alpha 5800, Solae, St. Louis, Missouri, USA
[4]Iota carrageenan, FMC Corp., Philadelphia, PA, USA
[5]Separate formulations for each of vanilla flavor, strawberry flavor, berry flavor, fruit flavor Example 2

Flavored Nutritional Beverage

| Ingredient | Gm/kg | Ingredient | gm/kg |
|---|---|---|---|
| Water | QS | Sodium citrate | 1.3 |
| Sucrose | 92.0 | Magnesium chloride | 1.2 |
| Maltodextrin DE 4-7[1] | 62.0 | Sodium chloride | 0.6 |
| Milk protein isolate[2] | 21.0 | Viscarin SA 359[3] | 0.56 |
| Calcium caseinate | 11.86 | UTM/TM Premix | 0.4 |
| High oleic safflower oil | 9.125 | Choline chloride | 0.36 |
| Canola oil | 9.125 | Ascorbic acid | 0.24 |
| Sodium caseinate | 8.0 | WSV Premix | 0.1839 |
| Corn oil | 4.55 | 45% KOH Solution | 0.17 |
| Potassium citrate | 3.0 | Vitamin DEK Premix | 0.066 |
| Tricalcium phosphate micron. | 2.4 | Vitamin A palmitate | 0.00132 |
| Magnesium phosphate dibasic | 2.11 | Potassium iodide | 0.000189 |
| Soy lecithin | 1.45 | Flavor[4] | 4.1 |

[1]Maltrin ® M040, Grain Processing Corp., Muscatine, Iowa, USA
[2]Alapro ® 4900, New Zealand Milk Products Inc., New Zealand
[3]Iota carrageenan, FMC Corp., Philadelphia, PA, USA
[4]Separate formulations for each of vanilla flavor, strawberry flavor, berry flavor, fruit flavor Example 3

Flavored Nutritional Beverage

| Ingredient | Gm/kg | Ingredient | gm/kg |
|---|---|---|---|
| Water | QS | Magnesium chloride | 1.16 |
| Sucrose | 92.3 | Sodium hexametaphosphate | 1.0 |
| Maltodextrin DE 4-7[1] | 68.9 | Sodium chloride | 0.72 |
| Milk protein isolate[2] | 36.9 | Choline chloride | 0.48 |
| Soy oil | 13.48 | Viscarin SA 359 | 0.45 |
| Corn oil | 5.39 | Ascorbic acid | 0.38 |
| Canola oil | 4.17 | UTM/TM Premix | 0.36 |
| Soy protein isolate[3] | 4.0 | 45% KOH solution | 0.31 |
| Potassium citrate | 2.7 | WSV Premix | 0.07 |
| Tricalcium phosphate micron. | 1.08 | Vitamin DEK Premix | 0.065 |
| Magnesium phosphate dibasic | 1.92 | Vitamin A palmitate | 0.0082 |
| Soy lecithin | 1.47 | Potassium iodide | 0.00019 |
| Sodium citrate | 1.62 | Flavor[5] | 4.1 |

[1]Maltrin ® M040, Grain Processing Corp., Muscatine, Iowa, USA
[2]Alapro ® 4900, New Zealand Milk Products Inc., New Zealand
[3]Supro 1610, Solae, St. Louis, Missouri, USA
[4]Iota carrageenan, FMC Corp., Philadelphia, PA, USA
[5]Separate formulations for each of vanilla flavor, strawberry flavor, berry flavor, fruit flavor Example 4

Chocolate Flavored Nutritional Beverage

| Ingredient | Gm/kg | Ingredient | gm/kg |
|---|---|---|---|
| Water | QS | Chocolate flavor | 1.2 |
| Sucrose | 90.3 | Sodium citrate | 1.5 |
| Maltodextrin DE 4-7[1] | 66.7 | Sodium chloride | 0.7 |
| Milk protein isolate[2] | 36.9 | Viscarin SA 359[4] | 0.4 |
| Soy Oil | 13 | Choline Chloride | 0.48 |
| Canola Oil | 5.1 | Ascorbic Acid | 0.38 |
| Cocoa Powder-alkali processed | 8.0 | UTM/TM Premix | 0.434 |
| Soy protein concentrate[3] | 4.0 | 45% KOH (process aid) | 0.315 |
| Corn Oil | 4.0 | WSV Premix | 0.1839 |
| Tricalcium phosphate micron. | 1.3 | Vitamin DEK Premix | 0.0653 |
| Magnesium phosphate bibasic | 3.4 | Vitamin A Palmitate | 0.00824 |
| Soy lecithin | 1.45 | Potassium Iodide | 0.000194 |
| Potassium citrate | 2.7 | | |

[1]Maltrin ® M040, Grain Processing Corp., Muscatine, Iowa, USA
[2]Alapro ® 4900, New Zealand Milk Products Inc., New Zealand
[3]Alpha-5800, Solae, St. Louis, Missouri, USA
[4]Iota carrageenan, FMC Corp., Philadelphia, PA, USA The exemplified beverages are prepared by methods well known in the nutrition and formulation arts, which most typically include the formation of at least three separate slurries that are later blended together, and then heat-treated and standardized. The resulting composition is then flavored, aseptically packaged into plastic bottles or retort sterilized. For those compositions comprising sodium hexametaphosphate, the latter is added during standardization, i.e., immediately prior to filling into beverage containers.

Experiment I

Nutritional beverages of the present invention are evaluated for color (Agtron Scores) at zero and three months after formulation. Each beverage is compared to a control that is a conventional milk-based beverage prepared by known manufacturing techniques with the ingredients listed in the following tables.

The chocolate flavored control beverage (Control 1) is compared to the chocolate flavored beverage of Example 4. The other control beverage base (Control 2) is compared to the other flavored beverages, but since the control is a base formula without flavorants, it is compared to the base formulas of Examples 1 and 3 without added flavorants.

| Chocolate flavored beverage (Control 1) | | | |
|---|---|---|---|
| Ingredient | Gm/kg | Ingredient | gm/kg |
| Water | QS | Soy Lecithin | 1.45 |
| Corn Syrup | 60.99 | Potassium Citrate | 1.358 |
| Sucrose | 60.44 | Chocolate Flavor | 1.2 |
| Maltodextrin DE 15 (Lodex 15)[1] | 51.9 | Sodium Citrate | 1.2 |
| Acid Casein | 18.45 | Sodium Chloride | 0.55 |
| High Oleic Safflower Oil | 8.79 | Viscarin SA 359[2] | 0.5 |
| Canola Oil | 8.79 | Choline Chloride | 0.48 |
| Cocoa Powder-alkali processed | 8.0 | Ascorbic Acid | 0.38 |
| Soy Protein Isolate | 7.84 | UTM Premix | 0.434 |
| Whey Protein Conc 75% | 6.86 | 45% KOH solution | 0.315 |
| Calcium Caseinate | 6.15 | WSV Premix | 0.1839 |
| Corn Oil | 4.4 | Vitamin DEK Premix | 0.0653 |

-continued

Chocolate flavored beverage (Control 1)

| Ingredient | Gm/kg | Ingredient | gm/kg |
|---|---|---|---|
| Tricalcium phosphate micron. | 3.2 | Vitamin A Palmitate | 0.00824 |
| Magnesium Chloride | 1.75 | Potassium Iodide | 0.000194 |
| Magnesium Phosphate Dibasic | 1.6 | | |

[1] Lodex ® 15 (maltodextrin) - Cerestar USA, Hammond, Indiana
[2] Iota carrageenan, FMC Corp., Philadelphia, PA, USA Nutritional Beverage Base (Control 2)

| Ingredient | Gm/kg | Ingredient | gm/kg |
|---|---|---|---|
| Water | QS | Sodium citrate | 1.3 |
| Sucrose | 92.0 | Magnesium chloride | 1.2 |
| Maltodextrin DE 4-7[1] | 62.0 | Sodium chloride | 0.6 |
| Milk protein isolate[2] | 21.0 | Viscarin SA 359[3] | 0.56 |
| Calcium caseinate | 11.86 | UTM/TM Premix | 0.4 |
| High oleic safflower oil | 9.125 | Choline chloride | 0.36 |
| Canola oil | 9.125 | Ascorbic acid | 0.24 |
| Sodium caseinate | 8.0 | WSV Premix | 0.1839 |
| Corn oil | 4.55 | 45% KOH Solution | 0.17 |
| Potassium citrate | 3.0 | Vitamin DEK Premix | 0.066 |
| Tricalcium phosphate micron. | 2.4 | Vitamin A palmitate | 0.00132 |
| Magnesium phosphate dibasic | 2.11 | Potassium iodide | 0.000189 |
| Soy lecithin | 1.45 | | |

[1] Maltrin ® M040, Grain Processing Corp., Muscatine, Iowa, USA
[2] Alapro ® 4900, New Zealand Milk Products Inc., New Zealand
[3] Iota carrageenan, FMC Corp., Philadelphia, PA, USA Results The results of the experiment are summarized in the following tables Vanilla Flavored Beverage-Base Formulas[2]

| | Beverage color-Agtron Scores[1] | |
|---|---|---|
| Nutritional beverage | Day 0 | 3 months |
| Control formula (vanilla) | 23.1 | 21.4 |
| Example 1 formula | 31.7 | 30.0 |
| Example 3 formula | 38.2 | 35.2 |

[1] Agtron Scores can range from zero (black) to 100 (white)
[2] Control and Examples 1 and 3 evaluated as base formulas without added flavorants Chocolate Flavored Beverages

| | Beverage color-Agtron Scores[1] | |
|---|---|---|
| Nutritional beverage | Day 0 | 3 months |
| Control formula (chocolate) | 8.8 | — |
| Example 4 formula | 12.0 | — |

[1] Agtron Scores can range from zero (black) to 100 (white)

As shown in the tables, each of the exemplified nutritional beverages of the present invention has a higher Agtron Score, and thus has a brighter colored appearance, than the corresponding control formula. Moreover, the data show that Example 3, the formula with sodium hexametaphosphate, has the highest measured Agtron Scores among the evaluated beverages. The use of hexametaphosphate in the nutritional beverages is therefore preferred for delivering improved, brighter colored beverages.

Experiment 2

A nutritional beverage of the present invention is evaluated for color performance. The beverage is formulated with one of several different phosphates or other materials and then evaluated for color appropriateness.

As shown in the following table, among the materials tested, sodium hexametaphosphate and sodium acid pyrophosphate have the highest color appropriateness score. Of those two, sodium hexametaphosphate has the highest Agtron score, and thus provides superior color performance as compared to the other materials. It is not completely understood exactly why sodium hexametaphosphate provides better color performance as compared to the other phosphates or other materials tested.

| Ingredient | Concentration | Color Appropriateness | Agtron |
|---|---|---|---|
| Na hexametaphosphate | 0.1% | 4.32 | 40.3 |
| Na acid pyrophosphate | 0.1% | 4.32 | 37.1 |
| NaEDTA | 0.05% | 4.06 | 34.6 |
| Tri sodium phosphate | 0.2% | 3.96 | — |
| Tetra sodium pyrophosphate | 0.2% | 3.96 | — |
| NutriFOS ®[1] | 0.1% | 4.03 | — |
| Control | — | 2.52 | 30.7 |

[1] Tri sodium polyphosphate

What is claimed is:

1. A nutritional beverage comprising
   (A) fat;
   (B) milk protein representing from about 10% to 100% by weight of total protein;
   (C) carbohydrate comprising from about 75% to 100% by weight of total carbohydrate of from about 0.1% to about 20% maltodextrin by weight of the nutritional beverage, the maltodextrin having a DE value of from about 2 to about 7,
   (D) an iron-containing material,
   (E) flavorant, and
   (F) from about 0.02% to about 5% by weight of sodium hexametaphosphate.

2. The nutritional beverage of claim 1 further comprising from about 0.05% to about 1.0% by weight of sodium hexametaphosphate.

3. A nutritional beverage comprising
   (A) fat;
   (B) milk protein representing from about 10% to 100% by weight of total protein;
   (C) carbohydrate comprising from about 75% to 100% by weight of total carbohydrate of at least one of
      (i) from about 0.1% to about 10% sucrose, trehalose, or combinations thereof, by weight of the nutritional beverage, and
      (ii) from about 0.1% to about 20% maltodextrin by weight of the nutritional beverage, the maltodextrin having a DE value of from about 1 to about 10, and
      (iii) combinations of (i) and (ii);
   (D) an iron-containing material;
   (E) flavorant; and
   (F) sodium hexametaphosphate.

4. The nutritional beverage of claim 3 wherein the flavorant comprises chocolate flavor.

5. The nutritional beverage of claim 4 wherein the chocolate flavored beverage has an Agtron Score from about 8 to about 15.

6. The nutritional beverage of claim 3 wherein the flavorant comprises at least one of vanilla flavor, butter pecan flavor, banana flavor, berry flavor, fruit flavor, or combinations thereof, wherein the beverage has an Agtron Score of at from about 20 to about 60.

7. The nutritional beverage of claim 6 wherein the beverage comprises vanilla flavor and has an Agtron Score of from about 25 to about 45.

8. The nutritional beverage of claim 3 wherein the milk protein is a milk protein isolate, milk protein concentrate, or combinations thereof.

9. The nutritional beverage of claim 3 wherein from about 90% to 100% by weight of the total carbohydrate is the maltodextrin.

10. The nutritional beverage of claim 9 wherein the maltodextrin has a DE value of from about 2 to about 6.

11. The nutritional beverage of claim 3 wherein the milk protein represents from about 80% to 100% by weight of the total protein.

12. The nutritional beverage of claim 3 wherein the iron-containing material provides from about 0.01 mg/100 ml to 5 mg/100 ml of iron per 100 ml.

13. The nutritional beverage of claim 12 wherein from about 50% to 100% by weight of the iron-containing material is iron sulfate.

14. The nutritional beverage of claim 3 further comprising at least one of tricalcium phosphate, calcium carbonate, or combinations thereof.

15. The nutritional beverage of claim 3 further comprising from about 20 mg/100 ml to about 300 mg/100 ml of calcium provided by tricalcium phosphate.

16. The nutritional beverage of claim 3 wherein the beverage comprises from about 0.1% to about 10% by weight of the maltodextrin.

17. The nutritional beverage of claim 3 wherein the beverage comprises, as a percentage of total calories, from about 10% to about 85% fat, from about 5% to about 80% protein, and from about 10% to about 85% carbohydrate.

18. The nutritional beverage of claim 3 comprising from about 0.02% to about 5% by weight of the sodium hexametaphosphate.

19. The nutritional beverage of claim 18 comprising from about 0.05% to about 1.0% by weight of the sodium hexametaphosphate.

* * * * *